United States Patent [19]

Paulsen

[11] Patent Number: 4,673,876
[45] Date of Patent: Jun. 16, 1987

[54] TWO-ELEMENT ANGULAR POSITIVE SENSOR FOR ROTATABLE SHAFT

[75] Inventor: Dean R. Paulsen, Danvers, Mass.

[73] Assignee: General Scanning, Inc., Watertown, Mass.

[21] Appl. No.: 587,709

[22] Filed: Mar. 8, 1984

[51] Int. Cl.[4] .................. G01B 7/30; H01L 43/08
[52] U.S. Cl. .................. 324/208; 338/32 R; 324/174
[58] Field of Search ........... 324/207, 208, 252, 235, 324/262, 260, 261, 117 R, 117 H, 97; 338/32 R, 32 H; 340/365 C, 365 VL

[56] References Cited

U.S. PATENT DOCUMENTS

| | | | |
|---|---|---|---|
| 2,987,657 | 6/1961 | Buchtenkirch et al. | 317/192 |
| 3,676,819 | 7/1972 | Keller | 338/32 R |
| 3,689,836 | 9/1972 | Snyder | 324/117 R |
| 3,745,503 | 7/1973 | Kobayashi | 338/12 |
| 3,753,180 | 8/1973 | Sommer | 335/272 |
| 3,777,273 | 12/1973 | Baba et al. | 329/200 |
| 3,835,373 | 9/1974 | Matula | 324/208 |
| 4,041,371 | 8/1977 | Hini | 324/208 X |
| 4,088,977 | 5/1978 | Bowman, Jr. et al. | 338/32 R |
| 4,107,604 | 8/1978 | Bernier | 324/208 |
| 4,125,821 | 11/1978 | Masuda | 338/32 R |
| 4,132,970 | 1/1979 | Masuda et al. | 324/252 X |
| 4,359,685 | 11/1982 | Equchi et al. | 324/208 |
| 4,384,252 | 5/1983 | Kolter | 324/208 X |
| 4,403,187 | 9/1983 | Takahashi et al. | 324/252 X |
| 4,480,248 | 10/1984 | Sudo et al. | 324/208 X |
| 4,490,674 | 12/1984 | Ito | 324/235 X |

Primary Examiner—Reinhard J. Eisenzopf
Assistant Examiner—Warren S. Edmonds

[57] ABSTRACT

An angular position sensor for determining the angular position of a shaft relative to a fixed support to which the shaft is rotatably connected, including a pair of interactive sensor elements respectively on the shaft and on the support, the elements being arranged for cooperation so that an electrical characteristic of at least one of the elements varies in accordance with the relative rotational positions of the elements, the cooperation being between two corresponding axially directed surfaces, one on each of the elements, a rigid spacer between and engaged upon the surfaces, and another member for permitting motion of one element along the axis of the shaft, for preventing motion of that one element in other directions than along the axis, and for applying a biasing force tending to press the elements toward each other against the corresponding surfaces of the spacer, for contact, whereby the spacing between the surfaces is kept constant by the spacer.

11 Claims, 5 Drawing Figures

TWO-ELEMENT ANGULAR POSITIVE SENSOR FOR ROTATABLE SHAFT

BACKGROUND OF THE INVENTION

This invention relates to an improvement in magneto-resistive angular position sensors used, for example, to determine the angular position of a galvanometer rotor.

Typically these sensors include a permanent magnet mounted on the end of the rotating shaft and a planar sensor fixed in an opposed, close relationship to the pole face of the magnet. The magnet is mounted so that its pole face is off-center with respect to the axis of the rotor shaft, but the sensor is centered with respect to that axis so that as the rotor turns, the pole face of the magnet sweeps over different portions of the sensor plane. As the rotor turns, the sensor's varying electrical response is measured by an appropriate circuit which determines the instantaneous angular position of the rotor, for use, e.g., in feedback control of the galvanometer. Thermal expansion, bearing wear, and other factors can affect the accuracy of such sensors.

SUMMARY OF THE INVENTION

In general, the invention features, in one aspect an angular position sensor for determining the angular position of a shaft relative to a fixed support to which the shaft is rotatably connected, including a pair of interactive sensor elements respectively on the shaft and on the support, the elements being arranged for cooperation so that an electrical characteristic of at least one of the elements varies in accordance with the relative rotational positions of the elements, the cooperation being between two corresponding axially directed surfaces, one on each of the elements, a rigid spacer between and engaged upon the surfaces, and means for permitting motion of one element along the axis of the shaft, for preventing motion of that one element in other directions than along the axis, and for applying a biasing force tending to press the elements toward each other against the corresponding surfaces of the spacer, in running contact at one respective interface, whereby the spacing between the surfaces is kept constant.

Thus, the gap between the opposed, electrically interactive sensor elements is kept constantly and precisely fixed, without manual adjustment, thus reducing spurious variations in the resistance of the sensor element that may occur, e.g., due to thermal expansion, or bearing wear.

In preferred embodiments, the means includes a member which has a portion which is flexible only with respect to the direction along the axis of the shaft, the member being attached to the support, one of the sensor elements being attached to the member with the flexible portion at a position to permit the element attached to the member to move along the axis of the shaft relative to the support; the means includes a magnet connected to one element and a permeable plate attached to the other element, the magnet and the plate cooperating to apply the biasing force; the sensor elements include a magnet and a magneto-resistive device; the means includes a flexible arm for holding one sensor element, the arm being electrically conductive and electrically connected to the one element held on the arm; the electrical characteristic is resistance; circuitry is provided for sensing the electrical characteristic and the circuitry is electrically connected to the arm; and the spacer is a glass plate.

The preferred embodiments are simple, easily fabricated, reliable, and economical; the magnet serves a dual function of interaction with the magnetoresistive device and interaction with the backing plate to impose biasing force; the spacing plate serves the dual function of establishing the size of the gap and protecting the surface of the magneto-resistive device; and the flexible arm serves the dual function of supporting the sensor element and providing electrical connection to it.

In another aspect, the invention features an angular position sensor for determining the angular position of a shaft of a moving iron galvanometer relative to a support to which the shaft is rotatably connected, including a magneto-resistive sensor having a pair of electrically interactive elements respectively on the shaft and on the support, the elements being arranged for cooperation so that the resistance of one element varies with the relative rotational positions of the elements, the cooperation being between two corresponding axially-directed surfaces, one on each of the elements, a rigid spacer between and engaged upon the surfaces, and means for permitting motion of one of the elements along the axis of the shaft, for preventing motion of the one element in directions other than along the axis, and for applying a biasing force tending to press the elements toward each other against the corresponding surfaces of the spacer, in running contact at one respective interface, whereby the spacing between the surfaces is kept constant.

Other advantages and features of the invention will become apparent from the following description of the preferred embodiment, and from the claims.

DESCRIPTION OF THE PREFERRED EMBODIMENT

We first briefly describe the drawings.

DRAWINGS

STRUCTURE, MANUFACTURE, AND OPERATION

Figure 1:
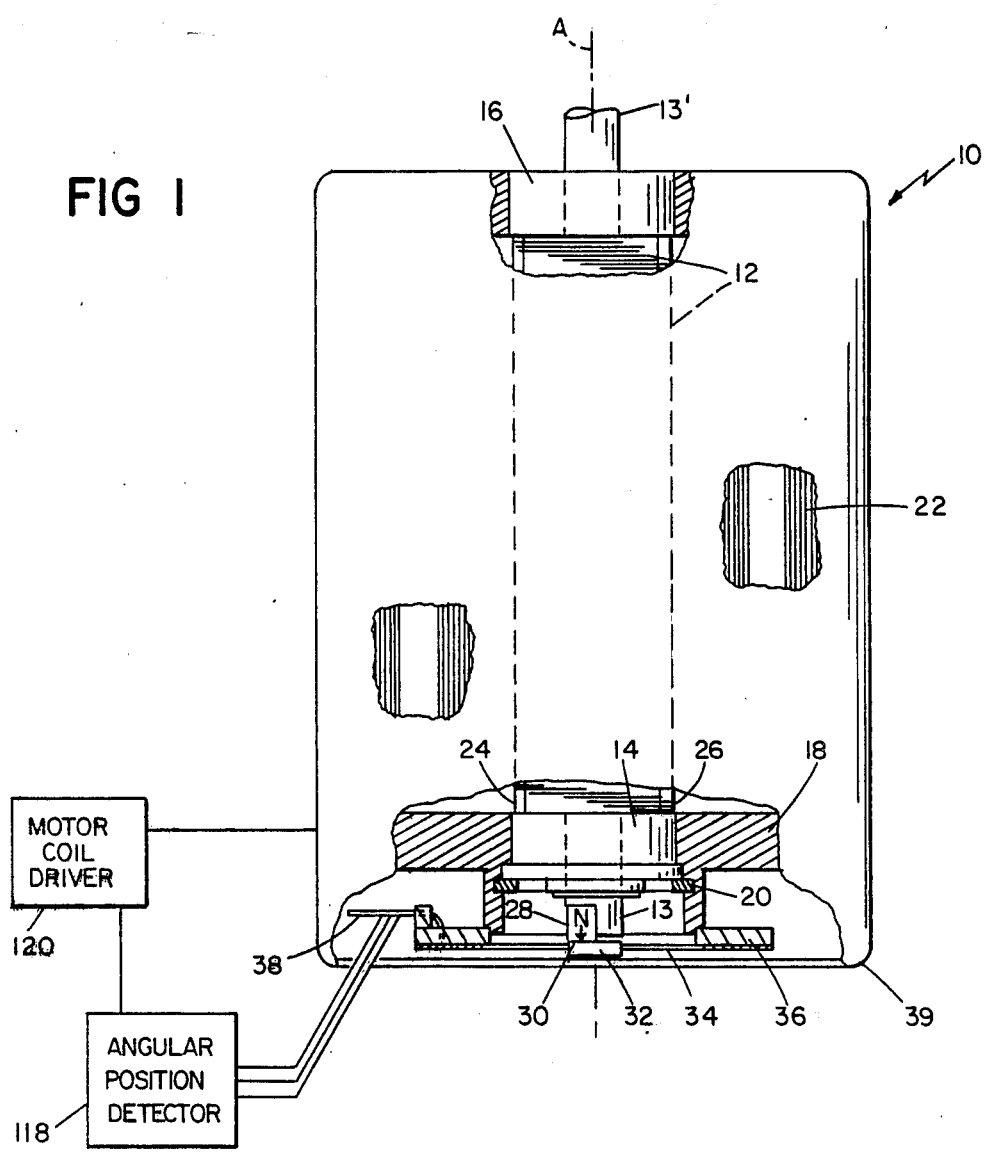
FIG. 1 is a side view, partially cut-away, of a galvanometer, including an angular position sensor.

Referring to FIG. 1, galvanometer 10 includes iron rotor 12 whose shaft ends 13, 13' are journaled respectively in a pair of bearings 14, 16. Bearing 14 is held in support 18 by retaining ring 20 thus fixing the axial position of rotor 12 with respect to support 18. Rotor 12 is driven electromagnetically by stator drive coil 22 via a pair of pole faces 24, 26 on rotor 12. Shaft end 13 has a notch in which a permanent magnet 28 is mounted (with its poles oriented as shown) so that the magnet rotates with rotor 12 around the axis A of shaft 13. One axially-directed face 30 of magnet 28 is in running physical contact with a corresponding axially directed surface of a position sensor assembly 32 which is supported by arms 34 from a printed circuit board 36 (1.100 in. by 1.145 in.). Arms 34 have a portion which is flexible only in the direction of axis A and sensor assembly 32 can thus move along axis A. Printed circuit board 36 is mounted on the end of support 18. Electrical connections to board 36 are made through connector pins 38. Rotor 12, stator drive coil 22, support 18, sensor 32, and board 36 are all housed within protective casing 39.

Figure 2:
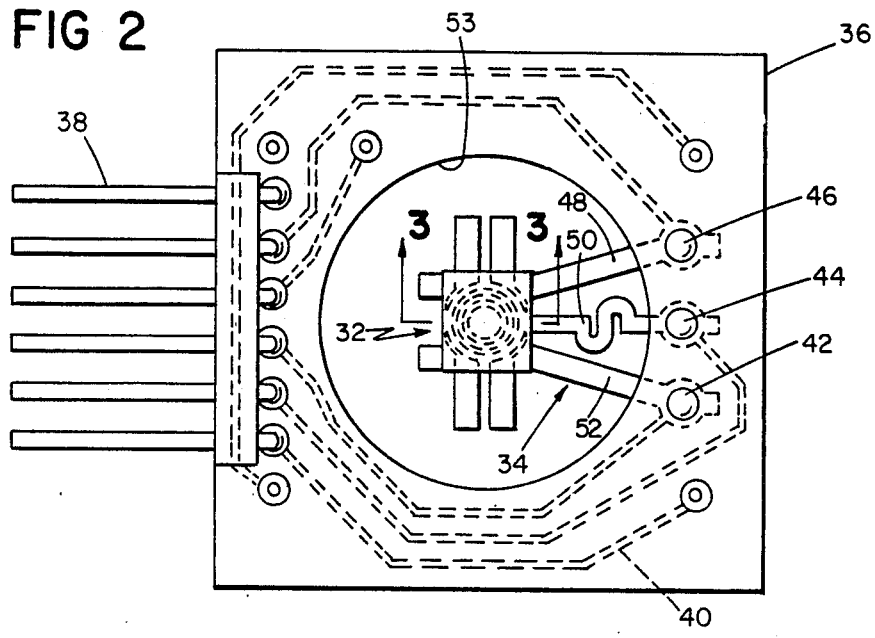
FIG. 2 is a top view of the sensor assembly and circuit board of FIG. 1, showing the arrangement of printed circuit conductors on the bottom of the board.

Referring to FIG. 2, one side of circuit board 36 bears printed circuit conductors 40 three of which end in connection tabs 42, 44, 46 to which arms 48, 50, 52 are respectively soldered. Board 36 has a hole 53 over which sensor assembly 32 is suspended by arms 34, such that motion of assembly 32 is permitted along the axis of shaft end 13, but is prevented in other directions.

Figure 3:
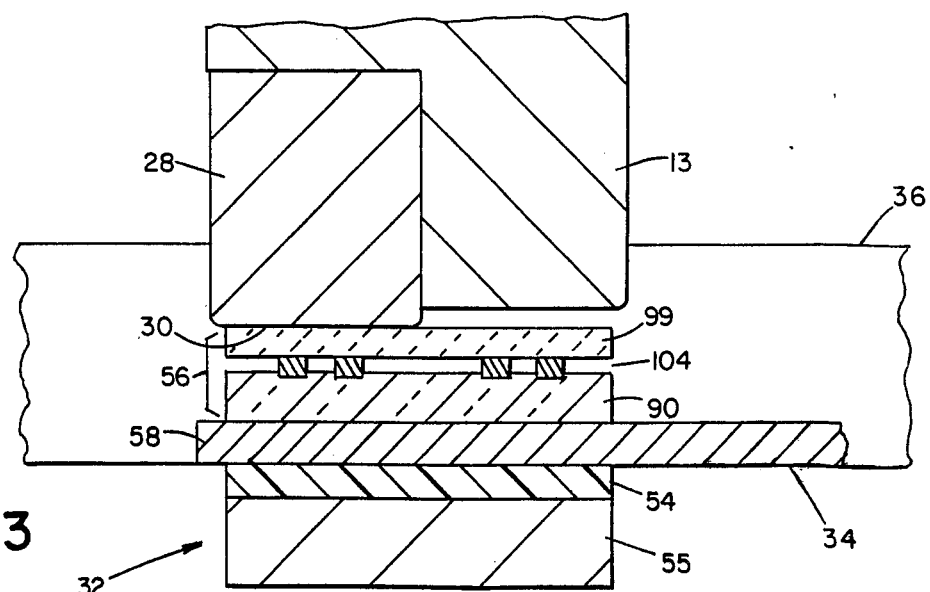
FIG. 3 is a sectional side view at 3—3 in FIG. 2, also showing a portion of the galvanometer rotor.

Referring to FIG. 3, position sensor assembly 32 is a sandwich including a magnetically permeable iron backing plate 55, an insulator 54, a supporting matrix 58, (which is an integral extension of and die cut from the same copper foil as spring arms 34), and a magneto-resistive sensor 56.

Figure 4:
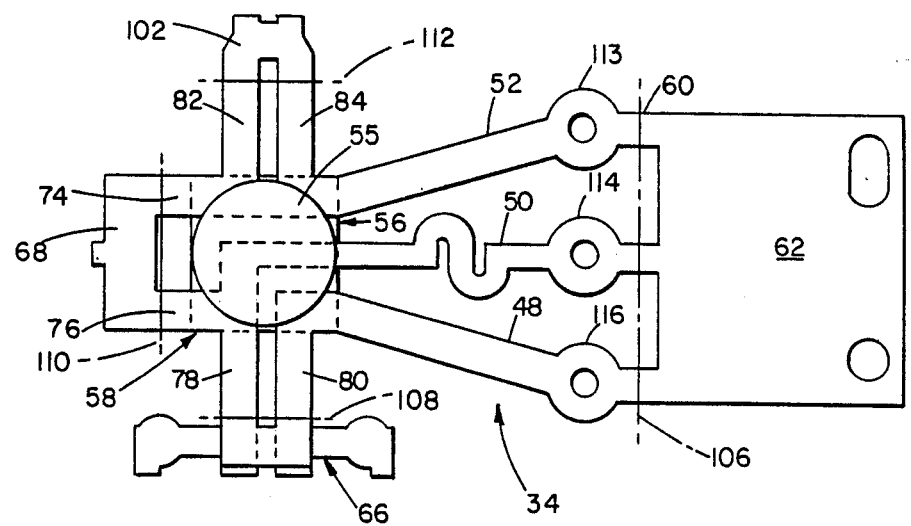
FIG. 4 is a bottom view of the sensor assembly of FIG. 1 at one stage of manufacture.
Figure 5:
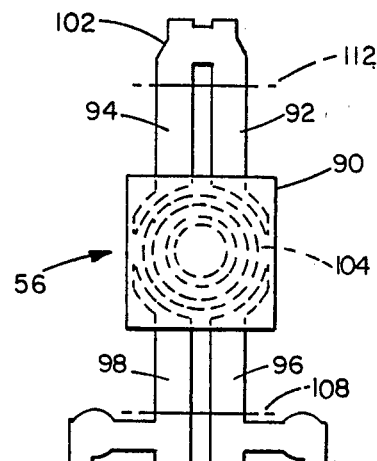
FIG. 5 is a plan view of the sensor element of FIG. 4.

Referring to FIG. 4, foil 60 is die cut to include flaps 62, 66, 68 which respectively support and maintain the spacing of arms 34, arms 74 and 76, and arms 78 and 80 during manufacturing. Foil 60 also includes arms 82, 84.

Referring to FIG. 3, sensor 56, available from Midori Precisions Company, Ltd, 2-17-1 Kokuryo-Machi, Chofu-Shi, Tokyo, 182, Japan, is a sandwich including a ceramic substrate 90 bearing an InSb sensor element 104, and four phosphor bronze arms 92, 94, 96, 98 (not shown in FIG. 3), each of which has one end embedded between substrate 90 and a protective, rigid, low-friction, wear-resistant glass spacer plate 99 and has its opposite end exposed. Arms 92, 94 are connected (before fabrication of the sensor) by a flap 102. Sensor element 104 is affixed on the surface of substrate 90 opposite plate 99 and electrically connected to arms 92, 94, 96, 98.

Referring again to FIG. 4, in manufacturing, foil 60 and sensor 56 are attached to each other in respective orientations such that arms 78, 80, 82, 84 respectively overlay arms 98, 96, 94, 92. Flaps 62, 66, 68, 102 are then removed by cutting along lines 106, 108, 110, 112.

Next, referring again to FIG. 2, sensor assembly 32 is mounted on board 36, by soldering tabs 113, 114, 116 (FIG. 4) respectively to tabs 42, 44, 46, with the center of sensor 56 precisely positioned at the center of hole 53. Board 36 is then mounted on support 18, the configuration of board 36 and rotor 30 being such that the axis of shaft end 13 intersects the center of sensor 56.

Sensor 56 is connected to three electrical paths via arms 34 and pins 38 to angular position detector 118 which uses signals generated by the motioh of magnet 28 as it sweeps in running contact across the surface of sensor 56 to determine the angular position of rotor 12, which it then delivers to motor coil driver 120 which provides drive signals to coil 22, thus enabling precise control of the galvanometer. The notch in shaft end 13 is oriented at 90 degrees about the axis of shaft end 13 with respect to the locations of pole faces 24, 26, so that the angular position of rotor 12 is determined once the angular position of magnet 28 is known.

Magnet 28 and backing plate 55 attract one another thus applying a small axial biasing force to sensor assembly 32 to cause low-friction, wear-resistant, rigid plate 99 to bear continuously against the corresponding pole face of magnet 28 even when temperature changes, bearing wear, or other factors cause small variations in the axial position of the pole face. Thus, the gap between the pole face and the sensor plane is kept constantly, precisely, and without manual adjustment, equal to the thickness of plate 99, reducing spurious variations in the resistance of sensor 56. Plate 99 also protects the sensor plane from damage.

The magnet serves the dual function of interaction with the magneto-resistive device and interaction with the backing plate to impose a biasing force. The spacer serves the dual function of establishing the size of the gap and protecting the surface of the magneto-resistive device. The flexible arms serve the dual function of supporting the sensor element and providing electrical connection to it.

Other embodiments are within the following claims.

I claim:

1. An angular position sensor for determining the angular position of a shaft relative to a fixed support to which the shaft is rotatably connnected, comprising a pair of interactive sensor elements respectively on said shaft and on said support, said elements being arranged for cooperation so that an electrical characteristic of at least one of said elements varies in accordance with the relative rotational positions of said elements, said elements comprising two axially directed surfaces, one on each of said elements, said cooperation being between said two corresponding axially directed surfaces, a rigid spacer between and engaged upon said surfaces, and means for permitting motion of one of said elements along the axis of said shaft, for preventing motion of said one element in directions other than along said axis, and for applying a biasing force tending to automatically and compliantly maintain said elements in contact against the corresponding surfaces of said spacer, in running contact at one respective interface, whereby the spacing between said axially directed surfaces is kept constant.

2. The sensor of claim 1 wherein said means comprises a member which has a portion which is flexible only with respect to the direction along the axis of said shaft, said member being attached to said support, one said element beinig attached to said member with said flexible portion at a position to permit said one element attached to said member to move along the axis of said shaft relative to said support.

3. The sensor of claim 1 wherein said means comprises a magnet connected to one said element and a permeable plate attached to the other said element, said magnet and said plate cooperating to apply said biasing force.

4. The sensor of claim 1 wherein said sensor elements comprise a magnet and a magneto-resistive device.

5. The sensor of claim 4 wherein said means comprises a permeable plate for cooperating with said magnet to apply said biasing force.

6. The sensor of claim 1 wherein said means comprises a flexible arm for holding one said sensor element, said arm being electrically conductive and electrically connected to said one element held on said arm.

7. The sensor of claim 1 wherein said electrical characteristic is resistance.

8. The sensor of claim 1 wherein said elements comprise a magneto-resistive device.

9. The sensor of claim 6 further comprising circuitry for sensing said electrical characteristic, said circuitry being electrically connected to said arm.

10. The sensor of claim 1 wherein said spacer is a glass plate.

11. An angular position sensor for determining the angular position of a shaft of a moving iron galvanometer relative to a support to which the shaft is rotatably connected, comprising a magneto-resistive sensor comprising a pair of electrically interactive elements respectively on said shaft and on said support, said elements being arranged for cooperation so that the resistance of one said element varies with the relative rotational positions of said elements, said elements comprising two axially directed surfaces, one on each of said elements, said cooperation being between two corresponding axially-directed surfaces, one on each of said elements, a rigid spacer between and engaged upon said surfaces, and means for permitting motion of one of said elements along the axis of said shaft, for preventing motion of said one element in directions other than along said axis, and for applying a biasing force tending to automatically and compliantly maintain said elements in contact against the corresponding surfaces of said spacer, in running contact at one respective interface, whereby the spacing between said axially directed surfaces is kept constant.

* * * * *